US009351116B2

(12) United States Patent
Xu et al.

(10) Patent No.: US 9,351,116 B2
(45) Date of Patent: May 24, 2016

(54) SYSTEM AND METHOD FOR PROVIDING PROXIMITY INFORMATION (71) Applicant: Hong Kong Baptist University, Kowloon (HK)

(72) Inventors: Jianliang Xu, Kowloon (HK); Haibo Hu, Kowloon (HK)

(73) Assignee: Hong Kong Baptist University, Hong Kong (HK)

( * ) Notice: Subject to any disclaimer, the term of this patent is extended or adjusted under 35 U.S.C. 154(b) by 138 days.

(21) Appl. No.: 13/905,456

(22) Filed: May 30, 2013

(65) Prior Publication Data
US 2014/0357299 A1 Dec. 4, 2014

(51) Int. Cl.
*H04W 4/02* (2009.01)
*H04W 12/02* (2009.01)
*G06F 3/048* (2013.01)
*H04W 4/20* (2009.01)

(52) U.S. Cl.
CPC ............... *H04W 4/023* (2013.01); *G06F 3/048* (2013.01); *H04W 4/206* (2013.01); *H04W 12/02* (2013.01)

(58) Field of Classification Search
CPC .............................. H04W 4/023; H04W 12/02
See application file for complete search history.

(56) References Cited

U.S. PATENT DOCUMENTS 8,213,617 B1 * 7/2012 Appleton ...................... 380/270

OTHER PUBLICATIONS

Ping, "Secure Proximity Monitoring in Mobile Geo-Social Services", Hong Kong Baptist University, Sep. 2010, pp. 1-11.*
Freni, "Privacy Preservation in Location-Based Proximity Services", University of Milan, 2011, pp. 35-92.*

* cited by examiner

*Primary Examiner* — Todd Melton
(74) *Attorney, Agent, or Firm* — Renner Kenner Greive Bobak Taylor & Weber (57) ABSTRACT

A method for privacy-preserving proximity detection comprising a grid-and-hashing paradigm, an optimal grid overlay and multi-level grids, which increases the detection accuracy while saving the wireless bandwidth. Furthermore, the present invention also provided a client-side location update scheme and the server-side update handling procedure for continuous proximity detection. The present invention is efficient and scalable under various system parameters and user moving speeds, in mobile geo-social networks.

18 Claims, 7 Drawing Sheets

SYSTEM AND METHOD FOR PROVIDING PROXIMITY INFORMATION

FIELD OF INVENTION

The present invention relates to a system and method for providing proximity information, and particularly, although not exclusively, to a system and method for providing proximity information to users in mobile geo-social networks.

BACKGROUND OF INVENTION

Figure 1:
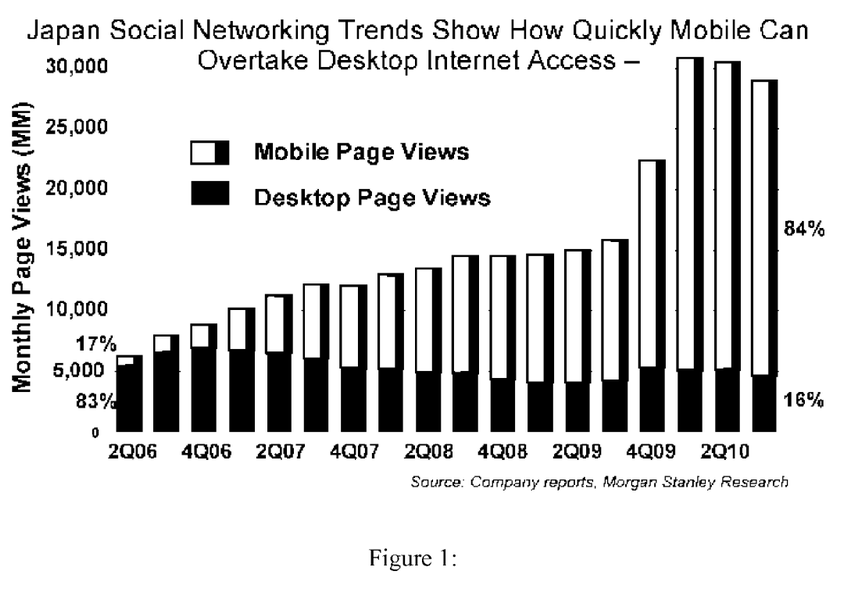
FIG. 1 shows social network access preference: mobile vs desktop.

Mobile social networks have been gaining increasingly popularity in the past couple of years. A recent survey by UK's Office of Communications (Ofcom) shows high penetration ratios of mobile social network in various countries (see Table 1). A report from Morgan Stanley also shows that users have a growing tendency to access their social networks more often by smartphones than desktop computers or laptops (see FIG. 1). Among all mobile social networking services, geo-social networking, which enables mobile users to interact based on their locations at any time and any place, is among the most appealing ones. For example, the Google Latitude service enables you to visualize the locations of nearby friends on a map and launch social activities such as chatting or collaborative filtering. As a typical example, you may ask your nearby friends "Where can I find good pizza around here?". A variety of similar services have been populated in the market, by either social network giants like Facebook, or specialized vendors like Foursquare, Gowalla, or Loopt.

TABLE 1

Mobile Social Network User Penetration (Source: Ofcom Consumer Research, October, 2010)

| Country | UK | FRA | GER | ITA | USA | JPN |
|---|---|---|---|---|---|---|
| Penetration rate % | 24 | 23 | 13 | 18 | 22 | 22 |

SUMMARY OF INVENTION

In accordance with a first aspect of the present invention, there is provided a method for providing proximity information comprising the step of processing a location data set having locations of a plurality of objects in a network space by applying a grid and hashing paradigm to the locations of the plurality of objects so as to generate a proximity set arranged to represent one or more proximity relationships between the one or more objects in the network space wherein,
the grid and hashing paradigm is arranged to transform the locations of the plurality of objects in the network space onto a multi-layered grid model arranged to model the network space so as to generate a plurality of signatures each associated with each of the plurality of objects in the multi-layered grid model.

In an embodiment of the first aspect, the plurality of signatures are compared to identify one or more proximity relationships between the one or more objects in the network space.

In an embodiment of the first aspect, the plurality of signatures are transformed from the location data set such that the locations of the plurality of objects in the network space are removed.

In an embodiment of the first aspect, the grid and hashing paradigm includes a one way hashing function arranged to encode the locations of the objects in the network space into the plurality of signatures.

In an embodiment of the first aspect, the signatures are arranged to be transmitted to a service provider from each of the one or more objects operating within the network space for re-transmission to all of the one or more objects.

In an embodiment of the first aspect, the service provider is prevented from processing the signatures to determine the locations of the plurality of objects.

These embodiment may be advantageous in that the signatures which are transmitted to the service provider is then redistributed to all of the objects so as to facilitate the operation of any services or applications which uses the proximity data. In addition, as the service provider is unable to devise the actual locations of the objects or users, the user's location and ultimately their privacy is enhanced.

In an embodiment of the first aspect, the multi-layered grid model includes one or more grid layers each having a plurality of cells to represent one or more partitions of the network space and are overlaid onto the network space so as to model the network space.

In an embodiment of the first aspect, the placement of the one or more grid layers onto the network space is unknown to a service provider operating within the network space.

In an embodiment of the first aspect, the one or more grids are overlaid into multiple layers to define the multi-layered grid model.

In an embodiment of the first aspect, the one or more grids are overlaid randomly or by shifting one or more grids on X-axis and Y-axis to form multiple layers of the one or more grids.

In an embodiment of the first aspect, the one or more grids are shifted in accordance with one or more desired accuracy variables.

In an embodiment of the first aspect, the plurality of cells are dynamically dimensioned based on the one or more desired accuracy variables.

In an embodiment of the first aspect, the one or more desired accuracy variables include a maximum false-negative threshold or a resource usage factor.

In an embodiment of the first aspect, further comprises a step of: updating the location data set to capture movements of the objects in the network space, wherein the step of updating the location data includes:
scanning the plurality of signatures associated with each of the plurality of objects in the multi-layered grid model to determine one or more changes with the one or more proximity relationships; and
whereupon the scan detects one or more changes between the one or more proximity relationships between the one or more objects in the multi-layered grid model, updating the location data set by requesting for an updated signature from the one or more objects detected to have one or more changes between the one or more proximity relationships of the one or more objects.

In an embodiment of the first aspect, the multi-layered grid model includes a lowest level grid overlay being initially placed with objects having no proximity relationships and one or more grid layers above the lowest level grid overlay which are each initially placed with objects having one or more proximity relationships.

In an embodiment of the first aspect, a dimension of each cell of each grid overlay increases at each grid overlay layer from the lowest level grid overlay to a top level grid overlay.

In an embodiment of the first aspect, the top level grid overlay includes a single cell dimensioned to cover the entire network space.

In an embodiment of the first aspect, the location data set is updated when upon the scan detects the one or more changes between the one or more proximity relationships between the one or more objects in an upper non-common layer of the multi-layered grid model, the upper non-common layer being a grid layer overlaid one grid layer below a first layer of the multi-layered grid model in which there is one or more proximity relationships between the one or more objects.

In an embodiment of the first aspect, the location data set is updated when upon the scan detects the one or more changes between the one or more proximity relationships between the one or more objects in a common social group.

In an embodiment of the first aspect, the one way hashing function is implemented with keyed cryptography.

In an embodiment of the first aspect, the network space is a communication network.

In accordance with a second aspect, there is provided a system for providing proximity information comprising a processor for processing a location data set having locations of a plurality of objects in a network space by applying a grid and hashing paradigm to the locations of the plurality of objects so as to generate a proximity set arranged to represent one or more proximity relationships between the one or more objects in the network space, wherein
the grid and hashing paradigm is arranged to transform the locations of the plurality of objects in the network space onto a multi-layered grid model arranged to model the network space so as to generate a plurality of signatures each associated with each of the plurality of objects in the multi-layered grid model.

Accordingly, it is an advantage of at least one embodiment of the present invention to provide a method for privacy-preserving proximity detection for mobile network.

Accordingly, it is also an advantage of at least one embodiment of the present invention primary object of the present invention to provide a method for privacy-preserving proximity detection comprising a grid-and-hashing paradigm, an optimal grid overlay and multi-level grids, which increases the detection accuracy while saving the wireless bandwidth.

In accordance with one aspect of the present invention, there is provided a client-side location update scheme and the server-side update handling procedure for continuous proximity detection.

In accordance to a further aspect of the present invention, there is provided a method for privacy-preserving proximity detection that is both efficient and scalable under various system parameters and user moving speeds, in mobile geo-social networks.

In one embodiment, the present invention relates to a method for privacy-preserving proximity detection comprising a grid-and-hashing paradigm, an optimal grid overlay and multi-level grids, which increases the detection accuracy while saving the wireless bandwidth. Furthermore, these embodiments may also provide a client-side location update scheme and the server-side update handling procedure for continuous proximity detection. These embodiments are advantageous in that the system for providing proximity information may be more efficient and scalable under various system parameters and user moving speeds, in mobile geo-social networks.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which.

DETAILED DESCRIPTION OF INVENTION

Without wishing to be bound by theory, the inventors through trials, research, study and review of results and observations is of the opinion that while mobile geo-social networking holds a lot of promise for business and marketing, increasing privacy concerns have been raised, which hinders its wider acceptance.

Figure 2:
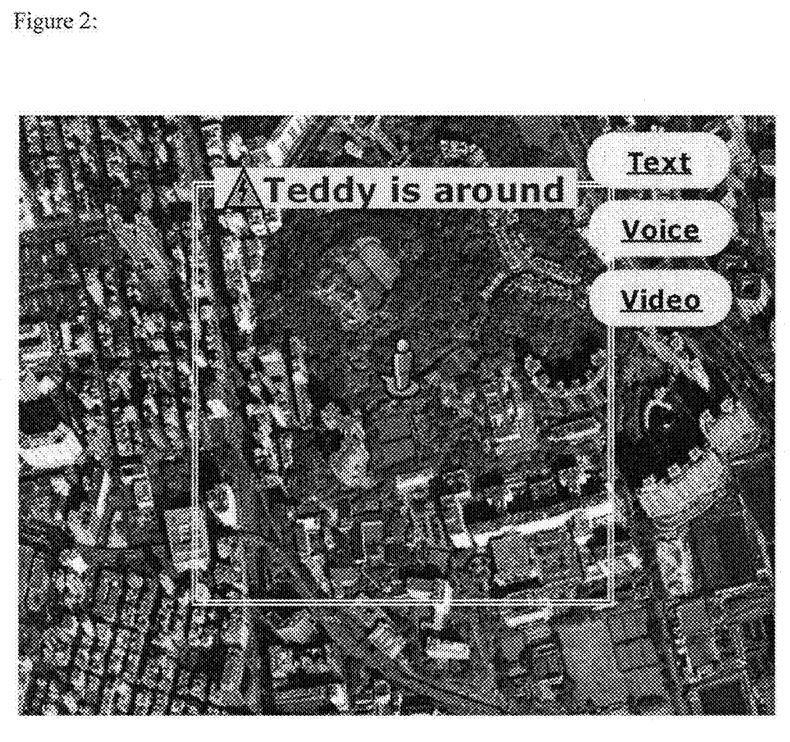
FIG. 2 shows an illustration of the "Nearby Friend Alert Service"

In particular, currently all these services collect location information from mobile users (though users may opt not to disclose their locations to untrusted users or even the service provider when they do not need the service). Although a large body of recent research has been carried out on preserving location anonymity in accessing location-based services (LBS), they mainly focus on queries over public points of interests (such as gas stations, and hotels). In these works, such as A. Beresford and F. Stajano, "Location privacy in pervasive computing," IEEE Pervasive Computing, vol. 2, no. 1, pp. 46-55, 2003, G. Myles, A. Friday, and N. Davies, "Preserving privacy in environments with location-based applications," Pervasive Computing, vol. 2, no. 1, pp. 56-64, 2003 and C.-Y. Chow, M. F. Mokbel, and W. G. Aref, "Casper*: Query processing for location services without compromising privacy," ACM Transactions on Database Systems, vol. 34, no. 4, 2009, only the location privacy of the requesting user needs to be protected. In contrast, the present invention addresses proximity detection, an arising category of mobile geo-social networking services. In these services, users not only issue proximity queries but also serve as the query results. As a typical example, the mobile service "nearby friend alert" notifies a user when her friend (i.e., users in the same social group, such as family, classmates, colleagues) is in close proximity to her, that is, they are within a (user-specified) distance away. FIG. 2 demonstrates this service, where "proximity" is set as within 500 meters of Manhattan distance (the sum of distances in each dimension), and agreed on by all members in the group. It is also noteworthy that this service runs continuously—the alert messages go on or off the screens when two friends move towards or away from each other.

This new service paradigm calls for privacy protection schemes on mutual parities—those querying and those being queried, and both are constantly moving. In recent literature, there are a few works that tackle this problem under different system models and proximity definitions. In S. Mascetti, C. Bettini, D. Freni, X. S. Wang, and S. Jajodia, "Privacy-aware proximity based services," in Proc. of MDM, 2009, pp. 31-40, Mascetti et al. assumed a trusted service provider (SP) and proposed a solution called "Hide&Crypt". In essence, it is a filter-and-refine two-phase procedure. In the first phase, to protect location privacy, all users cloak their locations into a set of granules (i.e., grid cells) and send them to the SP, who then filters out those pairs that are confirmed as non-result pairs. In the second phase, the SP notifies users of uncertain pairs to refine the proximity result. Specifically, each pair of users employ the finer granularity of both users, and then start a secure two-party set-inclusion protocol on the resulted sets of granules to detect whether any other user is in proximity. In S. Mascetti, D. Freni, C. Bettini, X. Wang, and S. Jajodia, "Privacy in geo-social networks: proximity notification with untrusted service providers and curious buddies," VLDB Journal, pp. 541-566, 2011, they further relaxed the requirement of a trusted SP and proposed two solutions for the same proximity detection problem. The first one, "Hide&Seek", treats the SP as an untrusted hub where users store their encrypted granules for the querying user to retrieve and detect proximity. Specifically, the querying user retrieves the encrypted granules, decrypts them, and computes his minimum distance to these granules to detect proximity. As such, in Hide&Seek the querying user knows the exact granule of the other users. The second solution, "Hide&Hash", further protects this exact granule from the querying user by hashing it instead of encryption. Then as in Hide&Crypt, the querying user starts a secure set-inclusion protocol with the SP to detect whether any other user is in proximity.

Assuming a non-trusted SP, Siksnys et al proposed the FriendLocator system in L. Siksnys, J. R. Thomsen, S. Saltenis, M. L. Yiu, and O. Andersen, "A location privacy aware friend locator," in Proc. Of SSTD, 2009, pp. 405-410., which is the first work that applies the "grid-and-hashing" techniques. The major difference from Hide&Hash is that FriendLocator employs a global (instead of user-specific) grid partitioning, which helps to eliminate the two-party protocol. Further, a multi-level granule system is designed to reduce location updates when users are far away from their friends. In L. Siksnys, J. R. Thomsen, S. Saltenis, and M. L. Yiu, "Private and flexible proximity detection in mobile social networks," in Proc. Of $11^{th}$ International Conference on Mobile Data Management (MDM), Kansas City, Mo., 2010, they further proposed VicinityLocator, which differs from all the above systems by enabling user-defined proximity criterion. Specifically, it allows the user to specify her area of interest as the "vicinity region"; a friend is in proximity only if the friend is located in this region. However, due to the complexity and high cost of the detection process, these works tend to adapt the original definition of proximity to align with the grid settings. In all "Hide&-" approaches, the minimum possible distance between two users is used for proximity detection. As such, if two users are in the same granule, they are considered in-proximity because their minimum possible distance is 0. Similarly in FriendLocator and VicinityLocator, the authors allow proximity to be defined fuzzily in uncertain cases. In FriendLocator, there are essentially two distance thresholds d and d+λ—users are strictly in-proximity within d and strictly not in-proximity beyond d+λ; but the relation for distances between these two values is decided arbitrarily; or quoted from the authors, "on a proximity notification, the actual distance between the two users can be in the range from d to d+λ", where $\lambda=d(2\sqrt{2}-1)$ is a non-user-configurable system constant. Likewise, in VicinityLocator, if the minimum distance between the user's location and the vicinity region is shorter than λ (but larger than 0), the proximity relation will be decided arbitrarily.

While the aforementioned works pioneer in the field of proximity detection, there is still lack of support on true proximity or a quantitative study of the detection accuracy with true proximity. In the present invention, based on the similar granule and hashing techniques as in previous works, there is proposed an example of a proximity detection scheme for the "nearby friend alert" service that can address the service inaccuracy (i.e., false-positive and false-negative detection) in a quantitative manner. In particular, one embodiment of the present invention may eliminate false-positive cases by setting an appropriate grid size.

To minimize false-negative detection, one possible method is to propose a grid overlay or referred to as a multiple layer grid model, which is a set of independent grids, and study the optimal placement of these grids. The key advantage of the present invention over existing works is that users can dynamically trade accuracy for communication cost (or vice versa) in a quantitative manner, by adding (or removing) a number of grids. This advantage is particularly critical in mobile environments where bandwidth and battery conditions may change drastically. To enhance the realtime performance of the present invention for large-scale systems, in some examples, it was also developed the multi-level grid scheme that can significantly reduce the user location update frequency and thus the server load. Based on this design, client-side location updates and the server-side update handling procedures are devised.

Citation or identification of any reference in this section or any other section of this application shall not be construed as an admission that such reference is available as prior art for the present application.

The present invention is not to be limited in scope by any of the specific embodiments described herein. The following embodiments are presented for exemplification only.

In accordance with one embodiment of the present invention, there is provided a system for providing proximity information comprising a processor for processing a location data set having locations of a plurality of objects in a network space by applying a grid and hashing paradigm to the locations of the plurality of objects so as to generate a proximity set arranged to represent one or more proximity relationships between the one or more objects in the network.

In one embodiment of the present invention, the user mobility is firstly ignored and proceed to analyze how the SP can detect two stationary users or objects u and v are in proximity. In this process, the coordinates of user u should not be disclosed to user v or the SP; further, "u is in proximity" is the only information known by v and the SP. For ease of presentation, in one example, it is assumed that all parties (the SP and mobile users) are non-colluding and follow a semi-honest model. In a semi-honest model, all parties follow the designated protocol properly except that they may record intermediate results and try to deduce about the location information of other users.

In this embodiment, it is assumed to use the Manhattan distance as a unit and δ denote the distance threshold for proximity. Throughout this description of the present invention, the Manhattan distance is used because it is a popular distance metric and more favorable than the Euclidean distance in urban area where this service is needed most. Let $(u_x, u_y)$ denote u's coordinates, then the distance between u and v are defined as $Dist((u_x, u_y), (v_x, v_y))=|u_x-v_x|+|u_y-v_y|$. The binary relation "in_proximity" of two users u, v, is true if and only if they are within δ meters away. Formally, in_proximity $(u, v):=Dist((u_x, u_y), (v_x, v_y))\le\delta$.

The concept of proximity detection without disclosing user locations is to apply a space transformation that preserves proximity, and the SP then detects proximity in the transformed space. This may also be referred to as applying the location data which may comprises of a list of user locations to a grid-hash paradigm arranged to generate a list of proximity relationships between each of the users, or indeed any objects. Preferably, the transformation is one-way so that the SP cannot infer the original user locations. In the one example embodiment, the "grid-and-hashing" transformation as in Mascetti et al. and Siksnys et al. This transformation or grid hash paradigm may impose a uniform grid G that represents a network of partitioned cells and together models a network space such as a geographical environment covered by a communication network or cellular mobile phone network. Note that in this example embodiment, the placement of G is a secret that is shared by users in the same group and unknown to the SP.

In this example embodiment, for each user u of $(u_x, u_y)$, her cell is indexed by $(G^x(u_x), G^y(u_y))$. The user then encodes this index by a one-way hashing function Γ and sends the hash value $\Gamma((G^x(u_x), G^y(u_y)))$ to the SP. This may be referred to as the hash value the signature of u with regard to grid G, denoted by G(u). To detect proximity of two users, the SP simply tests the equality of their uploaded signatures. To prevent reverse engineering of the cell and false positive results, Γ should be implemented by a keyed cryptographic (i.e., collision free) hash function, for example, SHA-256. The key is distributed among users in the same group and dynamically changing (e.g., by rehashing) against SP's inference.

In some instances, an arbitrary grid G may not necessarily preserve the proximity relation accordingly the choice of the cell size is critical. On the one hand, if the cell's half diagonal length lc>δ/2, the maximum Manhattan distance between two points in the same cell exceeds δ, which creates "false-positive" cases—that is, two users are detected as in_proximity while they are not. On the other hand, even if lc is arbitrarily small, two in_proximity users might still be separated in adjacent cells and thus have different signatures. These are the "false-negative" cases. For example, in FIG. 3(a), u and v are within δ meters away, but they are not in the same cell. In fact, to be in_proximity with u, v can be any point in the shaded region, and hereafter called the proximity region of u. The region is a square centered at u with its half diagonal length equal to δ.

Figure 3:
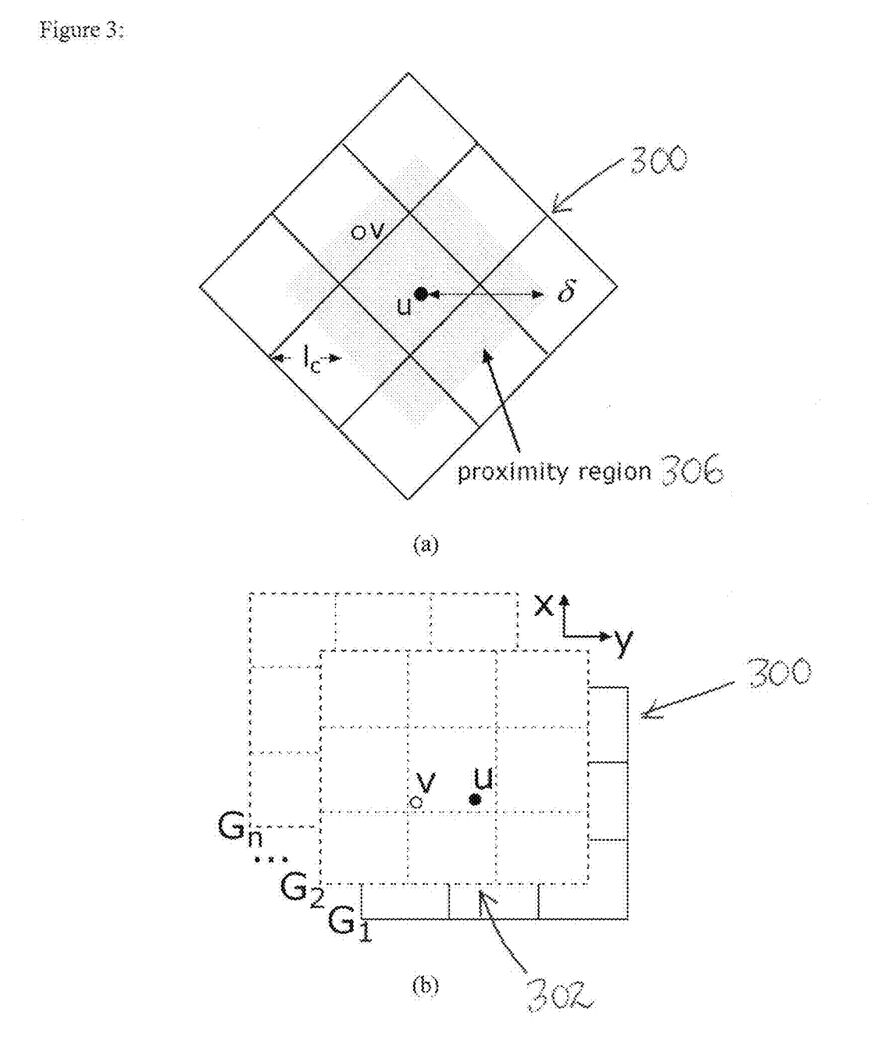
FIG. 3 shows the an illustration of the Static Proximity Detection, wherein (a) shows the Proximity Region, and (b) shows the Grid Overlay.

One manner in which it is possible to study how frequently the false-negative cases occur, it is possible to proceed to derive P(FN|in_proximity) and P(TP|in_proximity), the conditional probabilities of false-negative and true-positive detection, given the actual relation is "in_proximity". Assuming users are distributed uniformly in the network space. The latter probability equals to the proportion of one cell to the whole proximity region (see FIG. 3(a)). Formally, $$P(TP\mid\text{in\_proximity}) = 1 - P(FN\mid\text{in\_proximity}) \qquad (1)$$

$$= \max 1, (l_c/\delta)^2$$

From Eqn. 1, the larger the cell (i.e., $l_c$ increases), the fewer the false-negative cases. However, as aforementioned, when $l_c>\delta/2$, increasing $l_c$ will lead to more false-positive cases. Therefore, in one example, a design decision is to set $l_c=\delta/2$ to eliminate false-positives while keeping minimum number of false-negative cases. Thus the cell size, or its dimensions can effectively be determined based on the desired accuracy in the form of a desired accuracy variable which can be adjusted based on the minimum number of false-negatives which is deemed acceptable to the user, or that would be acceptable under the resource availability at a particular time.

Grid Overlay

From Eqn. 1, the false-negative probability by the standard "grid-and-hashing" approach is 75% as $l_c=\delta/2$. To further reduce it, a multi-layered grid model or referred to as a grid overlay scheme can be used. In one example, by imposing more than one grid partition $G_1, \ldots, G_n$, as shown in FIG. 3(b) to overlay each other, a multilayered grid model arranged to model the network space can be achieved. For ease of presentation, it is possible by rotating the coordinate system by 45° and thus all grid lines are either horizontal or vertical. Each grid is created from the previous one by some shifting on both x-axis and y-axis, in the hope that a false-negative case in one grid (e.g., u and v in $G_1$) can be successfully detected in another grid (e.g., in $G_2$). As such, the proximity detection of u and v should test the equality of their signatures with regard to all grids, i.e., $G_1(u)$ with $G_1(v)$, $G_2(u)$ with $G_2(v)$, ..., and $G_n(u)$ with $G_n(v)$. u and v are in_proximity as long as one of these pairs is equal. There are various examples as to the number of overlay grids n selected and how they are placed.

Figure 4:
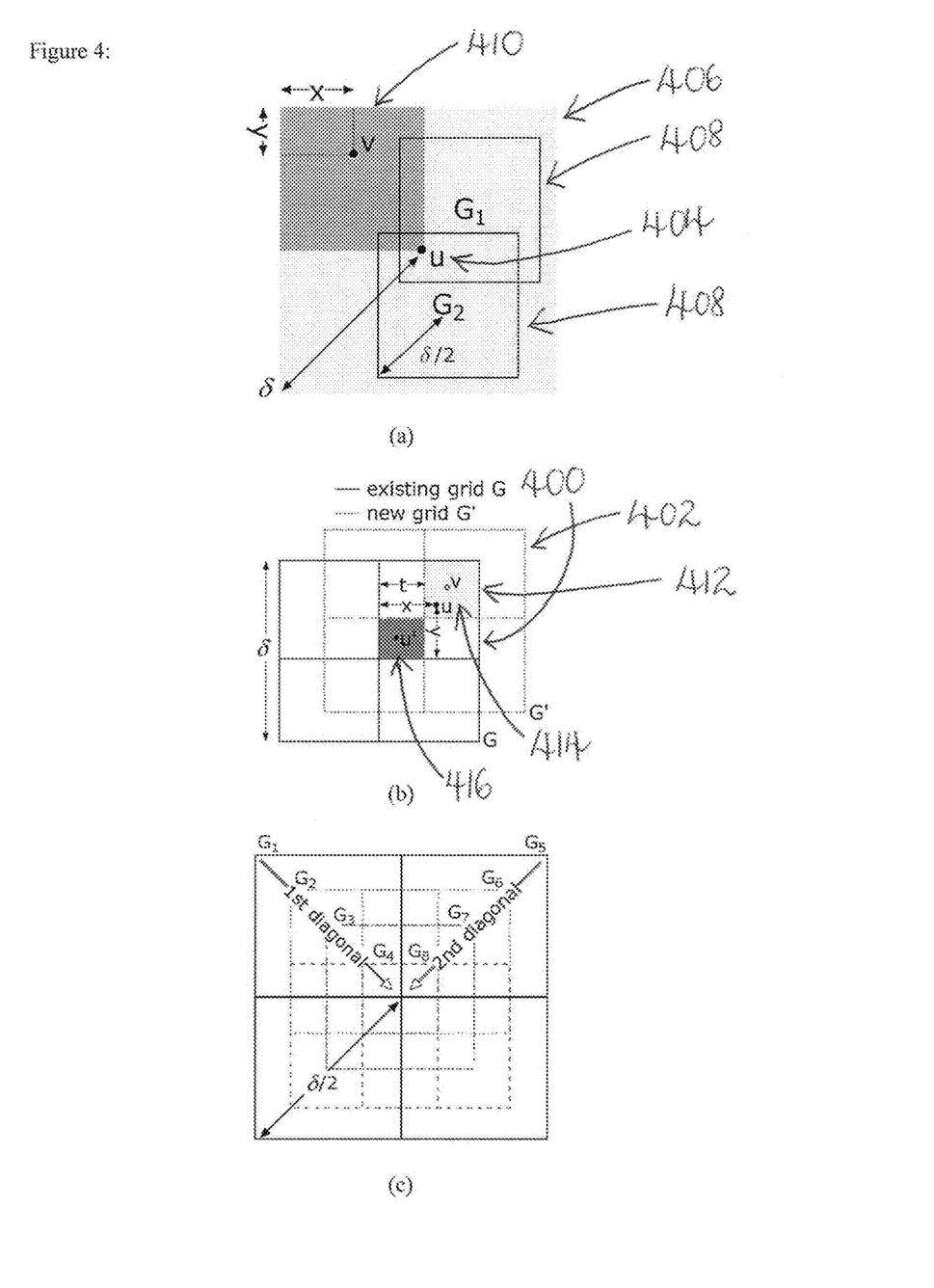
FIG. 4 shows the placement of grids wherein (a) shows a Random placement, (b) shows an Optimal placement and (c) shows an Optimal ($n=2^k-2$) placement.

In one example, a straightforward approach is to generate these grids by random shifting. FIG. 4(a) illustrates user u (404) and its proximity region (the light grey area 406). The solid boxes 408 are the cells that cover u in grids $G_1$, $G_2, \ldots, G_n$. Note that their top left corners must reside in the top left quadrant (the dark grey area) of u's proximity region. The probability of false-negatives P(FN|in_proximity) is the proportion of the proximity region that is not covered by any of the n covering cells. To calculate this area, firstly, it is possible to focus on the top left quadrant (the dark grey area) 410.

At point v=(x, y), the probability of v not being covered is $$\left(1 - \frac{2xy}{\delta^2}\right)^n.$$

Integrating both x and y and multiplying by four quadrants, it can be obtained the expected probability of false-negatives for n random-shifting grids.

$$P(FN \mid \text{in\_proximity}) = \frac{1}{n+1} \sum_{i=1}^{n+1} \frac{(-1)^n}{i} \binom{n+1}{i} \quad (2)$$

The second row of Table 2 shows this value as the number of grids n increases. In some examples, it may not drop significantly even when n grows exponentially.

TABLE 2

| | P(FN\|in_proximity) of Random and Optimal placement. | | | | | | |
|---|---|---|---|---|---|---|---|
| n | 2 | 8 | 16 | 32 | 64 | 128 | 256 |
| Random % | 61.1 | 31.4 | 20.2 | 12.4 | 7.32 | 4.22 | 2.39 |
| Optimal % | 43.8 | 23.4 | 12.1 | 6.15 | 3.10 | 1.56 | 0.78 |

To reduce this value, it is desirable to find the optimal placement of a new grid G' on top of n existing grids. In one example, by starting with n=1. FIG. 4(b) illustrates the placement of G' 402 and the existing G 401. Since each dimension is equal, it is assumed G' deviates t from G in each dimension. Without loss of generality, is it also assumed u is in the upper right cell of G 412. The area of true-positive cases for v is therefore the union of the two covering cells of u in G and G'. Therefore, minimizing P(FN|in_proximity) is equivalent to minimizing their overlapping area.

In this figure where u·x>t and u·y>t, the overlapping area is shown as the light grey area 414; if u·x<t and u·y<t (such as u'), this area is the dark grey area 416, and so on. In any case, this area achieves the minimum when t=δ/4. This same rationale applies to n>2. Suppose n=2k(k>1). The optimal grid overlay is created by shifting the first grid G in both diagonals for every 1/k of the cell length. FIG. 4(c) shows the case of k=4. Then the false-negative probability is (Note: It is noteworthy that the two diagonals share one duplicate grid (e.g., $G_1$ and $G_5$); and if k is odd, they share one more duplicate grid in the midpoint (e.g., $G_3$ and $G_7$). As such, the actual number of grids needed is either n−1 or n−2. For simplicity, it is possible to omit this saving of grids throughput herein.)

$$P(FN \mid \text{in\_proximity}) = \frac{2n-1}{n^2} \quad (3)$$

In practice, the SP may have a service level agreement (SLA) with the subscribers in this nearby friend-alert service, which declares a threshold value τ for the expected false-negative probability P(FN|in_proximity). The number of grids required may then be derived from Eqn. 3. Table 2 shows the numerical values side by side with those of the random placement. It is thus shown that the optimal placement achieves even lower false-negative probability with only half the number of random grids. In a similar manner as the cell dimension, thus the number of grids, in one example embodiment, may also be determined based on the desired level of service, such as the desired level of accuracy in the form of a desired level accuracy variable as determined or selected by a user based on the resources which are available to the user and how much resource the user would like to use. This in turn may be measured by a predetermined resource usage factor set by a user or SP.

Dynamic Proximity Monitoring with Location Anonymity

In one embodiment, it is possible to incorporate user mobility and study how the SP continuously monitors the in-proximity result: it alerts two users or objects when they are moving closer than the proximity threshold δ, and cancels the alert when they move apart. The continuous monitoring involves user signature update and SP query re evaluation, both of which will be addressed in the following. One example approach is that the user updates any signature of the grid overlay whenever it has been changed. Once the SP receives the updated signature, it will execute the proximity detection procedure as previously described. That is, it performs signature equality test against existing signatures from other users in the same group.

Figure 5:
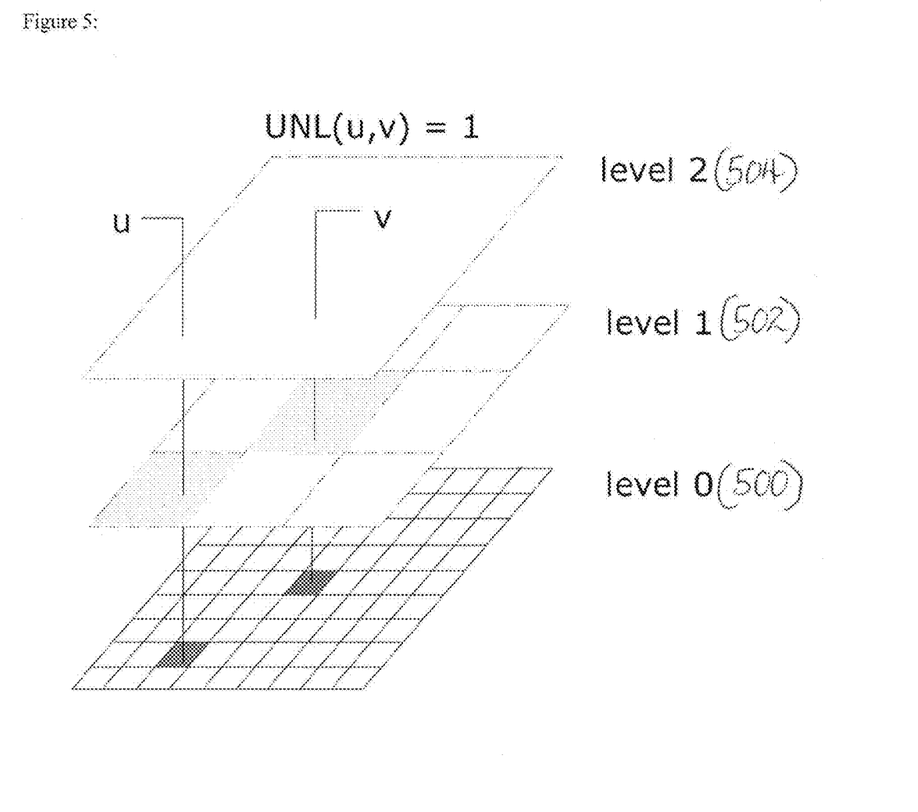
FIG. 5 shows the grids hierarchy and uppermost non-common level.

One difficulty with this approach is extremely costly as the overlay may contain dozens of grids and thus lead to frequent signature updates. One key observation to reduce such updates is that, updates for non-proximity pairs can be less frequent than updates for in-proximity pairs. To capture this, there is illustrated an example of a multi-level grid overlay (or multilayer grid model) hierarchy as shown in FIG. 5. The lowest level (level-0) grid overlay (500) is the original grid overlay for the static case.

Recall that the cell size (in terms of the half-diagonal length $l_c$) of any grid in this overlay is δ/2. This level of grid overlay is used for in-proximity pairs, while all upper levels (502 and 504) are used for non-proximity pairs. In any upper level (level-1, level-2, . . . ), the cell size is m times that of its immediate lower level (level-0, level-1, . . . ), until in the uppermost level (level-L) a single cell covers the entire space. The scaling factor m is a system parameter that should be based on the mobility pattern of users. In general, the more distance users may travel in a period of time, the larger m should be chosen. In FIG. 5, m=3. Note that for clarity, in FIG. 5 it is shown that only one grid is plotted in every level. As is discussed in a previous above, the number of grids needed in the level-0 grid overlay should be calculated from the false-negative probability threshold τ. The lower the τ, more grids are needed. Similarly, each overlay in the upper levels should have sufficient number of grids to guard all non-proximity pairs with the same false-negative probability threshold τ. In the i-th level, the expected false negative probability can be generalized from Eqn. 3 as follows.

$$P(FN \mid \text{in\_proximity}) = \frac{2n-1}{m^{2i}n^2} \quad (4)$$

Signature Update

Given this hierarchy, the signature update scheme for user u in one example embodiment is as follows. If user v is already in proximity, then u and v must have a common signature set (CSS) at level-0 (500), denoted by $CSS_0(u, v)$. As such, u should update when any signature in $CSS_0(u, v)$ is changed. (Note: Here it is required "any" not "all" because v could face the same update decision without knowing u's decision.) On the other hand, if v is not in_proximity, then u and v do not have a CSS at level-0, level-1, . . . , till in some level-i (i>0), their CSS is no longer empty. The level i−1 may be referred to as the "uppermost non-common level" (UNL) of u and v. For example, in FIG. 5, UNL(u, v)=1 (502) as they have a CSS in level-2 (504). Although any level below UNL also guarantees the non-proximity relation, UNL (502) is the highest such level and thus has the largest cell size to reduce signature update. Therefore, user u only needs to store the whole signature set (SS) in level UNL(u, v) and update when any such signature is changed.

The whole update decision of user u should base on all v's in the same social group. To summarize, u should update when there is any signature change in: (1) any in-proximity v's CSS0, or (2) any non-proximity v's $SS_{UNL}(u, v)$. As such, throughout the service running time, the user u needs to maintain either $CSS_0(u, v)$ or UNL(u, v) of all v's. To reduce the set of signatures to be checked, for (2) one can use a unified UNL instead of treating each v independently. UNL (u) is defined as the lowest UNL(u, v) of all non-proximity v's.

Query Re-Evaluation

Upon receiving an update of signature(s), the SP attempts to reevaluate the in_proximity relation of u and every v in the same group. If u and v were in_proximity, the SP checks if there is any update in $CSS_0(u, v)$. If there is no such update or the updated $CSS_0(u, v)$ is still non-empty, then u and v are still in-proximity. Otherwise, they are no longer in_proximity. To calculate UNL(u, v) for them, the SP probes v for her updated signatures in all levels. UNL(u, v) is then replied to both. On the other hand, if u and v were not in_proximity, the SP checks if there is any update in $SS_{UNL}(u, v)$. If there is no such update or the updated $CSS_{UNL}(u, v)$ is still empty, then u and v are still non-proximity and nothing else needs to be done. Otherwise, the SP probes v for her updated signatures in all levels to calculate the new relation of u and v. If they are now in_proximity, the SP replies to both with $CSS_0(u, v)$; otherwise, the SP replies to both with UNL(u, v). Note that throughout the service running time, the SP needs to maintain the same data structure as the users, i.e., $CSS_0(u, v)$ or UNL(u, v) of all (u, v) pairs.

Figure 6:
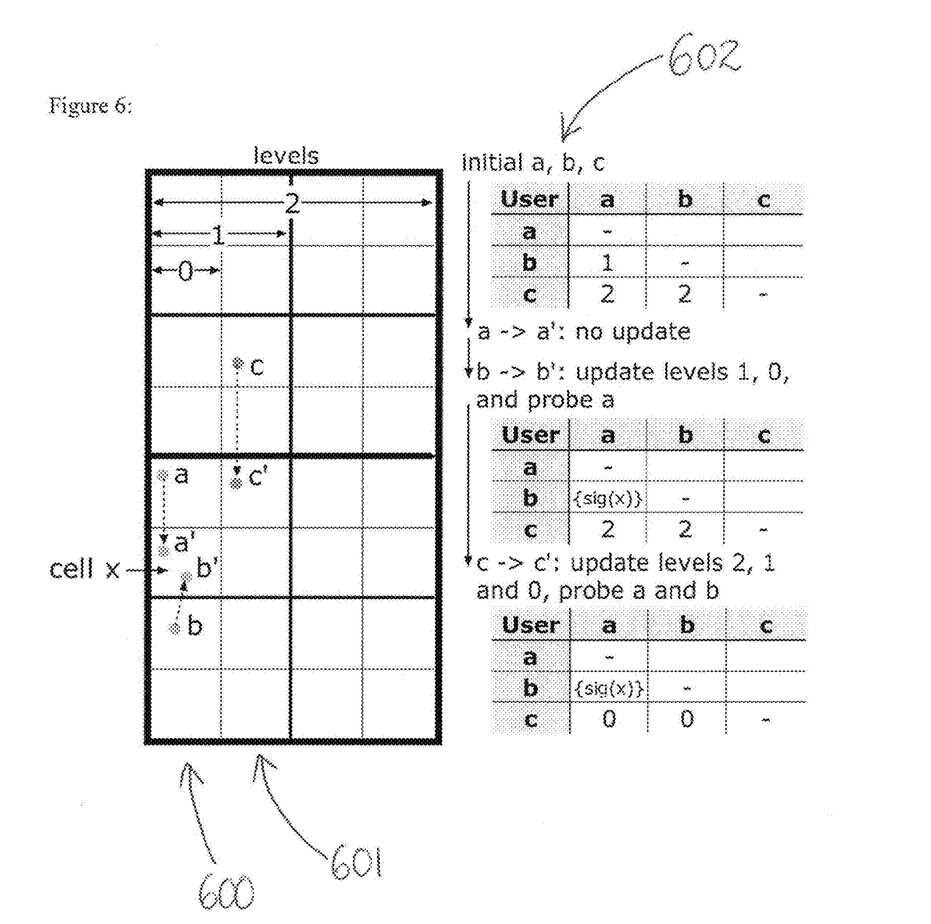
FIG. 6 shows the signature update and query re-evaluation: m=2, n=1, levels=3.

With reference to FIG. 6, there is illustrated an example of three users a, b, c (602). For simplicity, it is assumed only 1 grid in each level and m=2. Initially none of them are in_proximity with the other, and their mutual UNLs are listed in the table. When a moves to a', since only the signature of level 0 (600) is changed, and UNL(a)=1, a does not need to update. When b moves to b', since the signature of level 1 (601) is changed, and UNL(b)=1, b must update its signatures. To reevaluate the relation of a, b, a is probed. As $CSS_0(a, b)=\{sig(x)\}=\emptyset$, they are in_proximity and both will receive {sig(x)} as the reply. When c moves to c', since the signature of level 2 is changed, and UNL(c)=2, c must update its signatures. Both a and b are probed to re-evaluate their relations with c, both of which are non-proximity. They both receive the updated UNL=0 as the reply.

Examples of Empirical Results for One Embodiment of the Present Invention.

In one example attempt at evaluating the performance of one embodiment of the present invention, The data are generated from the moving object generator as described in T. Brinkhoff and O. Str, "A framework for generating network-based moving objects," Geoinformatica, vol. 6, pp. 153-180, 2002, based on the German city Oldenburg, which has been widely used in related studies by both Mascetti et al. and Siksnys et al. The dataset covers an area of $14 \times 12.26 \text{ km}^2$, and contains N=50,000 users. The generator creates the location of each user in every timestamp. The users are divided into social network groups whose average group size g_size=50. Table 3 summarizes the default settings of system parameters. The code of these experiments is implemented in C#, although any other computing programming language or computing instructions are possible. The multi-threaded simulation test bed, was, in this example, executed on a desktop computer with Intel Core2 Quad processor Q6600 and 4 GB RAM, running Windows XP 32-bit edition. For the cryptographic hashing algorithm, SHA-256 was used and is arranged to generate digests of 256 bits. For performance evaluation, measurements where made to the communication cost in terms of the number of bytes exchanged per-timestamp per user. To evaluate the system scalability, the server CPU time per-timestamp was also measured.

TABLE 3

Parameter setting for experiments

| Parameter | Symbol | Value |
| --- | --- | --- |
| # of users | N | 50,000 |
| Avg. group size | g_size | 50 |
| Avg. moving speed | v | 10 m/s |
| Proximity threshold | δ | 100 m |
| Multi-grid scaling factor | m | 3 |
| Number of grids | n | 32 |

Figure 7:
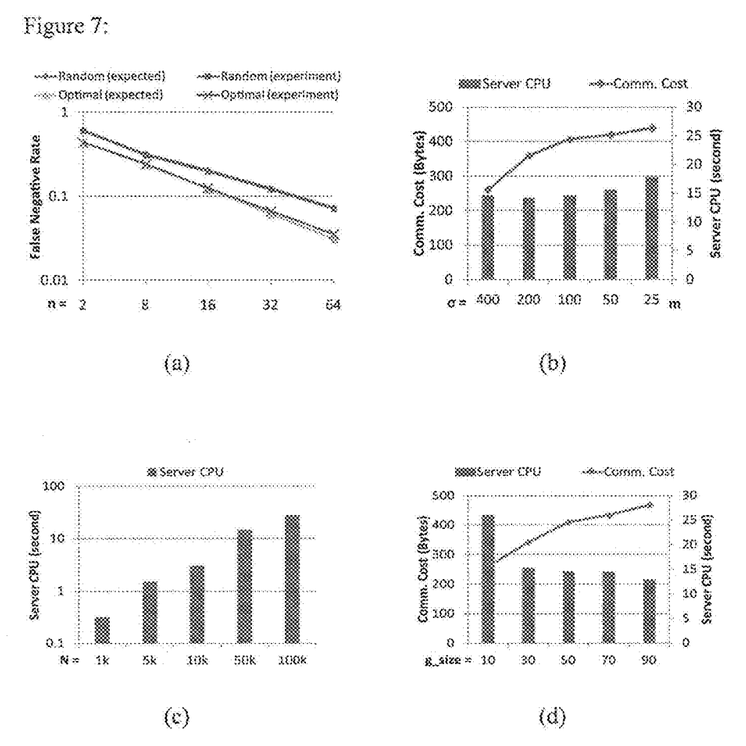
FIG. 7 shows the performance results vs system parameters wherein (a) shows False Positive Rate vs n; (b) shows Performance vs δ; (c) shows Server CPU vs N, and (d) shows Performance vs g_size.

In the first experiment, it was verified that embodiments of the present invention included the use of an optimal grid placement. In this first experiment, a single level overlay, vary the number of grids n and measure the false negative rate. FIG. 7(*a*) plots the values of both random and optimal grid placement, together with their expected values as derived in Table 2. The experiment values align well with the expected values, which verifies the claim that the optimal placement saves more than 50% of the grids from the random placement. For the following experiments, n=32 grids was consistently used, where the false negative rate is around 6%. In one example, this value of n may be low enough for most of users.

The second experiment tests the impact of proximity threshold δ. By varying δ from 400 to 25 meters and measure the communication cost and server CPU time. FIG. 7(*b*) plots the results. It was observed that even though δ drops to ¹⁄₁₆ from 400 to 25, i.e., more users become in_proximity, the communication cost only increases by about 65% and the server CPU time is almost unaffected. This is attributed to the multi-level grid overlay and the efficient signature update scheme that greatly reduces the update and reevaluation costs.

The third experiment tests the scalability of the proposed solution. By varying the number of users N from 1,000 to 100,000 and the average group size from 10 to 90. FIG. 7(*c*) plots the server CPU time with regard to N, which increases linearly as N increases. Further, since proximity detection is independent on different social groups, the system can be easily parallelized by delegating the execution to different processing cores. As such, the server CPU time can always be reduced as needed. FIG. 7(d) plots the results with regard to g_size. It is possible to observe that as g_size increases, the communication cost increases much slower, thanks to the multi-level signature update scheme that keeps most of non-proximity pairs in the upper levels. As an indicator, the server CPU time even drops as g_size increases. These results show that the system scales well to large number of users or large group size.

The present invention, at least in one embodiment, is advantageous in that it is able to provide solutions to the location privacy issue in mobile geo-social networks. In one example, the invention is an embodiment of a system for providing proximity information and may operate as a complete solution for the "nearby friend alert" service, which is a common and fundamental service. Under the umbrella of grid-and-hashing paradigm, there are at least two techniques that significantly increase the detection accuracy while saving the wireless bandwidth—optimal grid overlay and multi-level grids. Based on these two techniques, it was devised that the client-side location update scheme and the server-side update handling procedure for continuous proximity detection.

In alternative embodiments, certain embodiments may be further altered so as to operate with the general $L^p$ norm distance, where the Manhattan distance is its special case (p=1). This distance metric could facilitate a more versatile set of geo-social services where contexts of distance are different, such as location-based games, virtual reality, and location-aware advertising.

In some embodiments, the present invention discloses a method for privacy-preserving proximity detection comprising a grid-and-hashing paradigm, an optimal grid overlay and multi-level grids, which increases the detection accuracy while saving the wireless bandwidth. Furthermore, embodiments of the present invention may also provided a client-side location update scheme and the server-side update handling procedure for continuous proximity detection. Embodiments of the present invention may also be efficient and scalable under various system parameters and user moving speeds, in mobile geo-social networks.

In some embodiments, the different functions discussed herein may be performed in a different order and/or concurrently with each other. Furthermore, if desired, one or more of the above-described functions may be optional or may be combined.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extent. All publications recited herein are hereby incorporated by reference in their entirety.

The invention claimed is:

1. A method for providing proximity information comprising the step of:

processing a location data set having locations of a plurality of objects in a network space by applying a grid and hashing paradigm to the locations of the plurality of objects generating and continuously updating a proximity set arranged to represent one or more proximity relationships between the plurality of objects in the network space;

wherein the grid and hashing paradigm is arranged to transform the locations of the plurality of objects in the network space onto an optimal multi-layered grid model that is arranged to model the network space so as to generate a plurality of signatures each associated with a respective object in the optimal multi-layered grid model;

wherein the optimal multi-layered grid model includes two or more independent grid layers each having a plurality of cells representing a partition of the network space, the two or more grid layers being overlaid into multiple layers and onto the network space for modeling the network space;

wherein a dimension of the cells and/or a number of the two or more grid layers in the optimal multi-layered grid model is determined based on a desired level of service.

2. A method for providing proximity information in accordance with claim 1, wherein the plurality of signatures are compared to identify one or more proximity relationships between the plurality of objects in the network space.

3. A method for providing proximity information in accordance with claim 2, wherein the plurality of signatures are transformed from the location data set such that the locations of the plurality of objects in the network space are removed.

4. A method for providing proximity information in accordance with claim 3, wherein the grid and hashing paradigm includes a one way hashing function arranged to encode the locations of the plurality of objects in the network space into the plurality of signatures.

5. A method for providing proximity information in accordance with claim 4, wherein the plurality of signatures are arranged to be transmitted to a service provider from each of the plurality of objects operating within the network space.

6. A method for providing proximity information in accordance with claim 5, wherein the service provider is prevented from processing the plurality of signatures to determine the locations of the plurality of objects.

7. A method for providing proximity information in accordance with claim 1, wherein the placement of the two or more grid layers onto the network space is unknown to a service provider operating within the network space.

8. A method for providing proximity information in accordance with claim 1, wherein the two or more layers are overlaid randomly and/or are shifted with respect to each other along an X-axis and a Y-axis.

9. A method for providing proximity information in accordance with claim 8, wherein the two or more layers are shifted in accordance with one or more desired accuracy variables.

10. A method for providing proximity information in accordance with claim 9, wherein the plurality of cells are dynamically dimensioned based on the one or more desired accuracy variables.

11. A method for providing proximity information in accordance with claim 10, wherein the one or more desired accuracy variables include a maximum false-negative threshold or a resource usage factor.

12. A method for providing proximity information in accordance with claim 1, further comprising a step of:
updating the location data set to capture movements of the plurality of objects in the network space, wherein the step of updating the location data set includes:
scanning the plurality of signatures to determine a change of the one or more proximity relationships; and
whereupon the scan detects a change of the one or more proximity relationships, updating the location data set by requesting for an updated signature from one or more of the plurality of objects detected to be associated with the change.

13. A method for providing proximity information in accordance with claim 12, wherein the optimal multi-layered grid model includes a lowest level grid layer being initially placed with objects having no proximity relationships and one or more grid layers above the lowest level grid layer which are initially placed with objects having one or more proximity relationships.

14. A method for providing proximity information in accordance with claim 13, wherein a dimension of the cells of the grid layers increases from the lowest level grid layer to a top level grid layer.

15. A method for providing proximity information in accordance with claim 14, wherein the plurality of cells in the top level grid layer is merged into a single cell that is dimensioned to cover the entire network space.

16. A method for providing proximity information in accordance with claim 15, wherein the location data set is updated when the scan detects a change of the one or more proximity relationships between the plurality of objects in an upper non-common layer of the optimal multi-layered grid model, the upper non-common layer being one grid layer below a layer of the optimal multi-layered grid model in which there is one or more proximity relationships between the plurality of objects.

17. A method for providing proximity information in accordance with claim 16, wherein the location data set is updated when the scan detects a change of the one or more proximity relationships between the plurality of objects in a common social group.

18. A system for providing proximity information comprising
a processor for processing a location data set having locations of a plurality of objects in a network space by applying a grid and hashing paradigm to the locations of the plurality of objects and for generating and continuously updating a proximity set arranged to represent one or more proximity relationships between the plurality of objects in the network space;
wherein the grid and hashing paradigm is arranged to transform the locations of the plurality of objects in the network space onto an optimal multi-layered grid model arranged to model the network space so as to generate a plurality of signatures each associated with a respective object in the optimal multi-layered grid model;
wherein the optimal multi-layered grid model includes two or more independent grid layers each having a plurality of cells representing a partition of the network space, the two or more grid layers being overlaid into multiple layers and onto the network space for modeling the network space;
wherein a dimension of the cells and/or a number of the two or more grid layers in the optimal multi-layered grid model is determined based on a desired level of service.

* * * * *